(12) United States Patent
Sands et al.

(10) Patent No.: US 7,001,626 B2
(45) Date of Patent: Feb. 21, 2006

(54) AUTOMATED GRILL

(75) Inventors: Jeffrey L. Sands, Freeport, IL (US);
James D. Conlin, South Beloit, IL (US); Thomas J. Franken, Roscoe, IL (US); Andrew Paul Franklin, Beloit, WI (US); Randy L. Ginner, Beloit, WI (US); Ronald J. Glavan, Rockton, IL (US); Scott A. Glawe, Roscoe, IL (US); David A. Hill, Beloit, WI (US); Michael J. Newberry, Poplar Grove, IL (US); Jack Pellicane, Wyomissing, PA (US); Manuel Calzada, Rolling Meadows, IL (US); Henry Thomas Ewald, Roselle, IL (US)

(73) Assignees: Carrier Commerical Refrigeration, Inc., Syracuse, NY (US); McDonald's Corporation, Oakbrook, IL (US)

( * ) Notice: Subject to any disclaimer, the term of this patent is extended or adjusted under 35 U.S.C. 154(b) by 417 days.

(21) Appl. No.: 10/124,629

(22) Filed: Apr. 17, 2002

(65) Prior Publication Data

US 2003/0196558 A1    Oct. 23, 2003

(51) Int. Cl.
*A01K 43/00* (2006.01)
(52) U.S. Cl. .................. 426/231; 426/523; 426/524; 99/325; 99/389; 99/443 C; 99/484; 62/381; 221/150 A
(58) Field of Classification Search ........... 426/231, 426/523, 524; 99/325, 389, 443 C, 484; 62/378, 381; 221/150 A
See application file for complete search history.

(56) References Cited

U.S. PATENT DOCUMENTS

| 5,305,615 | A |   | 4/1994  | McFadden et al. |
|---|---|---|---|---|
| 5,365,835 | A | * | 11/1994 | Naramura ................... 99/325 |
| 5,878,910 | A | * | 3/1999  | Gibernau et al. ....... 221/150 A |

FOREIGN PATENT DOCUMENTS

| EP | 0406475    | 1/1991 |
|---|---|---|
| EP | 0455477    | 11/1991 |
| SE | 513 106    | 7/2000 |
| WO | WO 96/16584 | 6/1996 |

OTHER PUBLICATIONS

International Search Report Dated Aug. 22, 2003.

* cited by examiner

*Primary Examiner*—Drew Becker
(74) *Attorney, Agent, or Firm*—Carlson, Gaskey & Olds (57) ABSTRACT

An automated grill automatically transfers frozen food from a freezer component to grilling component by an automatic loading device in response to a signal. Frozen food is loaded in a loading side in the freezer component. When the signal is received indicating that the food is to be grilled, food in a feeding side is raised and delivered to the loading device. When a sensor detects that food is positioned in the loading device, the loading device removes the food from the freezer component and into the grilling component. The food is then grilled as it travels between two substantially vertical grilling structures each surrounded by a conveyor belt. Preferably, the conveyor belt is made of a non-stick coated Invar. A lateral sensor detects and compensates for lateral movement of the conveyor belts. After the food exits the grilling component, the food slides onto a heated holding area for serving.

25 Claims, 7 Drawing Sheets

AUTOMATED GRILL

BACKGROUND OF THE INVENTION

The present invention relates generally to an automated grill which transfers frozen food from a freezer component to a grilling component by an automated loading device in response to a signal.

Grills or griddles are used to cook various foods, such as hamburgers. In one prior grill, the sides of the food are grilled separately. The food is placed on a flat grill portion, grilling the side of the food that contacts the flat grill portion. After that side of the food is cooked, the food is manually flipped to allow cooking the opposite side. After the food is cooked, the food is manually removed from the grill for serving.

In another prior grill, both sides of the food are grilled simultaneously. After programming the type of food into a control unit, the food is placed on a lower grill portion. A platen having an upper grill portion is then lowered over the food, positioning the food between the upper and lower grill portions and grilling the food simultaneously on both sides. After lowering the platen, the distance between the upper and lower grill portions is automatically adjusted according to the type of food which is programmed into the control unit. After a predetermined amount of time has passed, the platen raises, and the food is manually removed from the grill.

Another prior grill employs a conveyor belt positioned over a heater. The food is manually placed on the conveyor belt by an operator and grilled while the conveyor belt passes over the heater.

There are several drawbacks to the grills of the prior art. For one, the food must be manually placed on and removed from the grill, requiring additional labor. If the food is not immediately removed from the grill, overcooking is possible.

SUMMARY OF THE INVENTION

The automated grill of the present invention automatically transfers frozen food from a freezer component to a grilling component by an automatic loading device in response to a signal.

The freezer component includes a rotatable portion, a loading side and a feeding side. Two raiseable platforms are located in each of the loading side and the feeding side. Food is loaded into the freezer component by placing the food onto the platforms positioned in the loading side. The rotatable portion then rotates 180° to position the food-loaded platforms in the feeding side. The empty platforms now located in the loading side are loaded with additional food. When a signal is received, food in the feeding side is supplied to the loading device by alternately raising the two platforms holding the food. When the feeding side is empty and contains no more food, the rotatable portion rotates 180° in the reverse direction, positioning the recently food-loaded platforms in the feeding side and the empty platforms in the loading side.

The loading device includes a pair of feeders each having a cutout and a sensor. The cutout is located over the feeding side. When a sensor detects that food is positioned in the cutout, a motor slides the feeder out of the freezer component to remove the food from the freezer component for delivery to the grilling component. Alternatively, the loading device is a pivotal arm which pivots to slide the food out of the freezer component.

The grilling component includes a pair of grilling structures supported at an oblique angle from the vertical. Each grilling structure includes a heater and a moveable conveyor belt positioned around the heater. As the food travels on the conveyor belts between the heaters, the food is cooked. Preferably, the conveyor belt is made of a non-stick coated Invar™. A lateral sensor positioned proximate to an edge of each of the conveyor belts detects and compensates for lateral movement of the conveyor belts.

After the food exits the grilling structures, the food slides onto a heated holding area for serving.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1A, 2A, 2B:
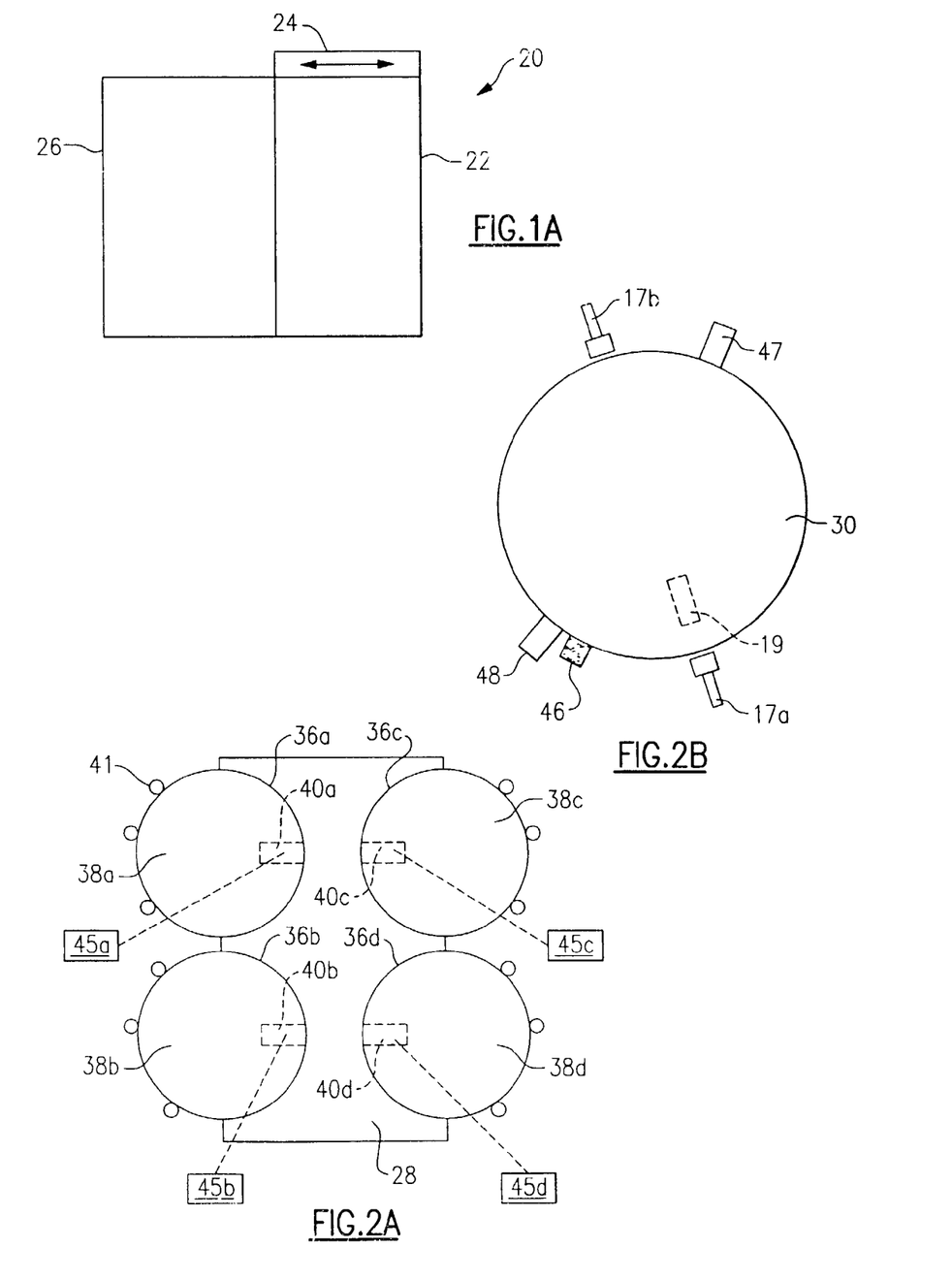
FIG. 1A schematically illustrates a block style schematic diagram of the automated grill of the present invention.
FIG. 2A schematically illustrates a cross sectional view of the freezer component of the automated grill of FIG. 1B taken along line 2—2.
FIG. 2B schematically illustrates a top view of the carousel of the freezer component.

FIG. 1A illustrates a schematic block diagram of an automated grill 20. The automated grill 20 includes a freezer component 22, a grilling component 26, and a loading device 24 which automatically transfers food from the freezer component 22 to the grilling component 26 in response to a signal.

Figure 1B:
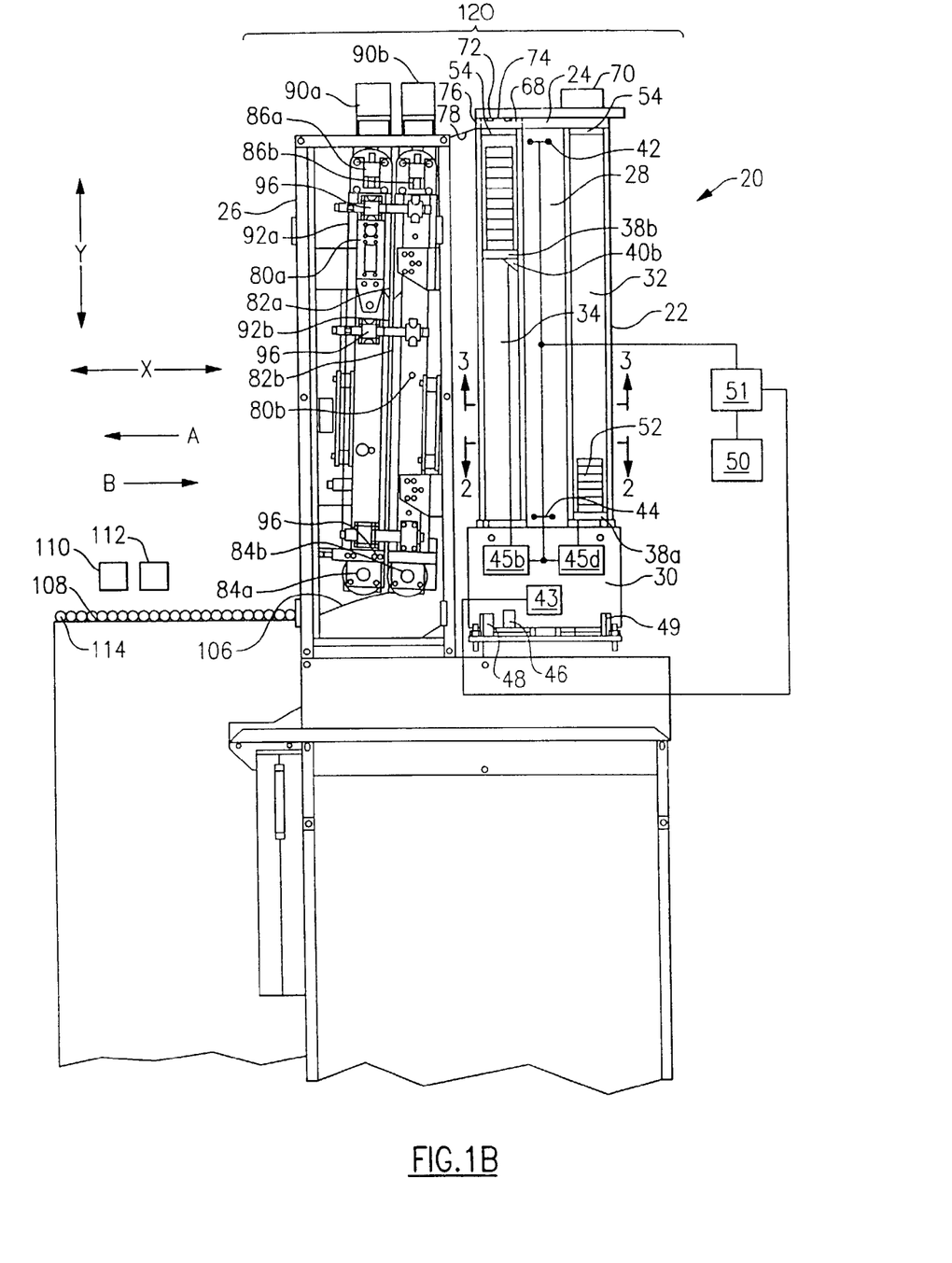
FIG. 1B schematically illustrates a side view of the automated grill of the present invention.

FIG. 1B illustrates an example automated grill 20 designed according to the present invention. Frozen food items 52, such as frozen hamburger patties, are loaded in the freezer component 22. The freezer component 22 includes a rotatable portion 28 mounted on a carousel 30. The freezer component 22 further includes a loading side 32 and a feeding side 34. An upper sensor 42 and a lower sensor 44 are located proximate to the upper end and the lower end, respectively, of the rotatable portion 28.

The freezer component 22 in one example uses forced air convection. In another example, the freezer component 22 comprises a cold wall freezer Preferably, the temperature in the freezer component 22 is between −18° C. and −21° C.

As shown in FIG. 2A, the example rotatable portion 28 includes four surfaces 36a, 36b, 36c and 36d. When the rotatable portion 28 is positioned as in FIG. 1B, the surfaces 36a and 36b are located in the feeding side 34, and the surfaces 36c and 36d are located in the loading side 32. A platform 38a, 38b, 38c and 38d is received against each of the respective surfaces 36a, 36b, 36c and 36d and is moveable in the Y direction (i.e., up or down according to FIG. 1B) by a drive 40a, 40b, 40c, and 40d, respectively, shown in phantom, which is powered by a respective motor 45a, 45b, 45c and 45d (shown in FIG. 1B). Preferably, the platforms 38a, 38b, 38c and 38d are circular.

When the platforms 38c and 38d in the loading side 32 are in a loading position, the platforms 38c and 38d are loaded with the food items 52. Rods 41 located on the outer periphery of the platforms 38a, 38b, 38c and 38d create a cage to prevent the items of food 52 from falling from the platforms 38a, 38b, 38c and 38d during rotation of the rotatable portion 28. After a desired number of food items 52 are loaded, the carousel 30 rotates the rotatable portion 28 180° in a first direction, positioning the platforms 38c and 38d with the loaded food items 52 in the feeding side 34. The same motion moves the platforms 38a and 38b to the loading side 32. The platforms 38a and 38b can then be loaded with more food items 52.

As shown in FIG. 2B, the carousel 30 includes a magnet 19. Opposing sensors 17a and 17b, such as magnetic reed sensors, are positioned proximate to the carousel 30. When the carousel 30 rotates 180° and the sensor 17a detects the magnet 19, a signal is sent to the motor 43 by the control 51 to stop rotation of the carousel 30. When the carousel 30 is rotated 180° in the opposing direction and the sensor 17b detects the magnet 19, a signal is sent to the motor 43 by the control 51 to stop rotation of the carousel.

The carousel 30 further includes a projection 46 to prevent over-rotation. Stops 47 and 48 located in the freezer compartment 22 prevent over-rotation of the carousel 30 and tangling of wires (not illustrated). If the carousel 30 over-rotates, the projection 46 engages one of the stops 47 and 48, preventing further rotation of the carousel 30.

Returning to FIG. 1, when at least one of the food items 52 is to be grilled, an input 50 sends a signal to a control 51 which sends a signal to the desired motor 45c and 45d to raise at least one of the respective platforms 38c and 38d in the feeding side 34 to position a food item 52 in the loading device 24 for delivery to the grilling component 26. As the rotatable portion 28 has rotated 180°, the platforms 38c and 38d are located in the feeding side 34 and the platforms 38a and 38b are located in the loading side 32. The food items 52 are alternately delivered from the platforms 38c and 38d to the loading device 24. For example, after the input 50 sends a signal indicating a request to grill a food item 52, platform 38c rises to position a food item 52 in the loading device 24. When the next signal is received, platform 38d rises to position another food item 52 in the loading device 24. A subsequent signal raises the platform 38c, and so on.

Preferably, the input 50 includes a POS (point of service) register. When a food item 52 is ordered by a customer, an operator inputs the order into the POS register. The POS register sends the signal to the control 51, which responsively dispenses the desired number of food items 52. Alternatively, an operator inputs into the input 50 the numbers of food items 52 that are to be delivered to the grilling component 26 for grilling.

The platforms 38c and 38d rise until all the food items 52 in the feeding side 34 are eventually transferred to the grilling component 26 for grilling. When the upper sensor 42 senses that both of the platforms 38c and 38d are positioned in an empryposition, that is, the platforms 38c and 38d are in a position where the loading device 24 would have removed all of the food items 52, the feeding side 34 is empty. The carousel 30 then rotates the rotatable portion 28 180° in an opposing direction. If the carousel 30 over-rotates, the projection 46 engages the other stop 47 to prevent over-rotation. A sensor 49 monitors the position of the carousel 30 and communicates to the carousel 30 when to stop rotating.

Rotation in the opposition direction positions the platforms 38a and 38b loaded with the food items 52 in the feeding side 34, and the platforms 38c and 38d holding no food items 52 in the loading side 32. During rotation, the platforms 38c and 38d in the loading side 32 lower so they are ready to receive additional food items 52. When the lower sensor 44 senses the platforms 38c and 38d are lowered and in the loading position, the automated grill 20 knows that the loading side 32 is ready for loading of additional food items 52.

Preferably, the upper sensor 42 and the lower sensor 44 are magnetic reed switches and the platforms 38a, 38b, 38c, and 38d include a magnet. When the upper sensor 42 or lower sensor 44 sense the magnet, the sensors 42 or 44 detect the platforms 38a, 38b, 38c and 38d and can determine if the platforms 38a, 38b, 38c and 38d are in the loading portion or in the empty position. [40] After all the food items 52 are removed from the feeding side 34 of the freezer component 22, the platforms 38c and 38d are in the empty position. When the upper sensor 42 senses the magnet in the platforms 38c and 38d in the feeding side 34, the upper sensor 42 knows that the platforms 38c and 38d are in the empty position. The upper sensor 42 provides a signal to the motor 43 to rotate the carousel 30 and to the motors 45c and 45d of the respective empty platforms 38c and 38d to lower the platforms 38c and 38d. Therefore, the platforms 38c and 38d will be in the loading position once in the loading side 32. Once the platforms 38c and 38d are in the loading position in the loading side 32, the lower sensor 44 detects the magnets. Although magnetic sensors have been described, it is to be understood that other types of sensors 42 and 44 can be employed.

Figure 3:
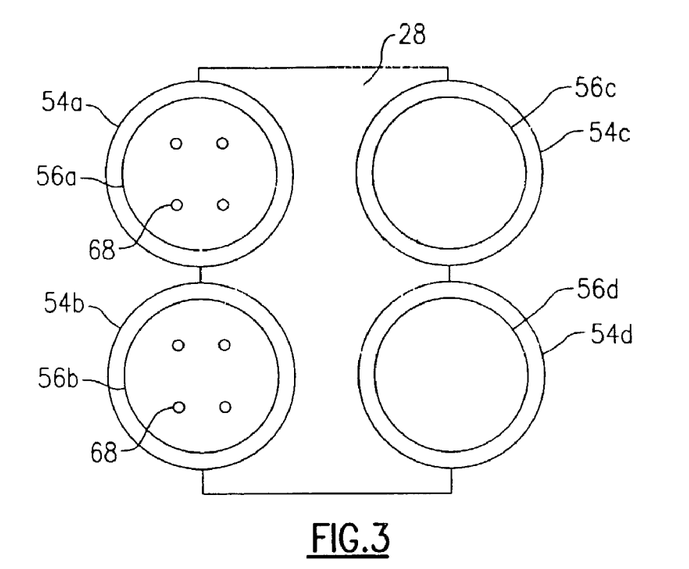
FIG. 3 schematically illustrates a cross sectional view of the freezer component of the automated grill of FIG. 1B taken along line 3—3.

As shown in FIG. 3, a ring 54a, 54b, 54c and 54d is secured to the top of the rotatable portion 28 in each of the respective four surfaces 36a, 36b, 36c and 36d. The rings 54a, 54b, 54c and 54d each include an inner aperture 56a, 56b, 56c, and 56d sized to allow passage of the food items 52. The rings 54a, 54b, 54c and 54d assist in guiding the stack of the food items 52 as the platforms 38a, 38b, 38c and 38d lift and funnel the food items 52 into the loading device 24. In one example, the rings 54a, 54b, 54c and 54d have a height which is sized to receive several food items 52 at once.

Alternatively, the freezer component 22 does not include a carousel 30 and a feeding side 34. The food items 52 are both loaded into the freezer component 22 and transferred into the loading device 24 in the loading side 32. The food items 52 can be loaded into the loading side 32 in a cartridge which contains a plurality of food items 52 to expedite the loading process.

Figure 4:
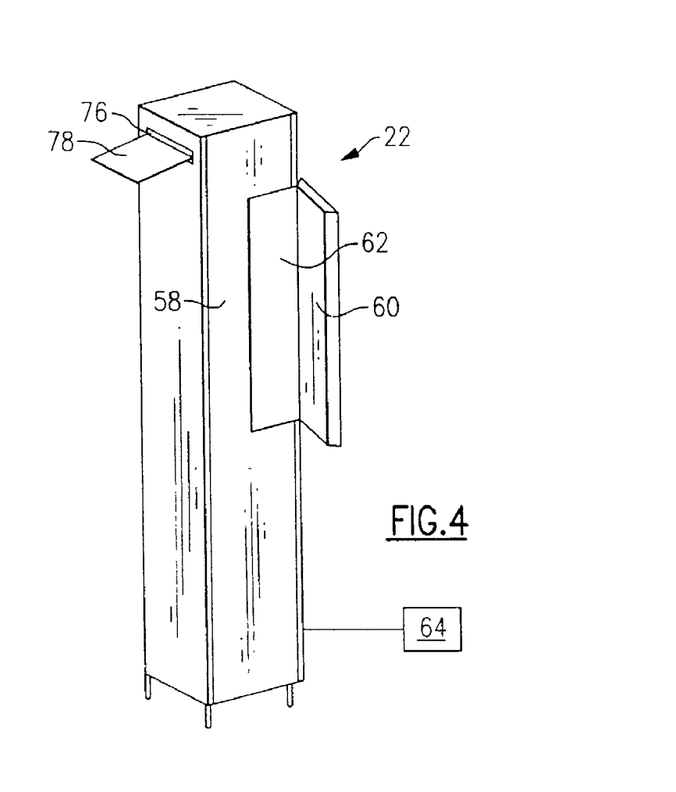
FIG. 4 schematically illustrates a perspective view of the exterior of the freezer component of the automated grill.

As shown in FIG. 4, the freezer component 22 is enclosed by a housing 58 including a door 60. When the door 60 is opened, an operator can access the loading side 32 of the freezer component 22 through an access opening 62 during operation. The example freezer component 22 further includes an interlock 64 which prevents rotation of the rotatable portion 28 when the door 60 is opened.

Figure 5:
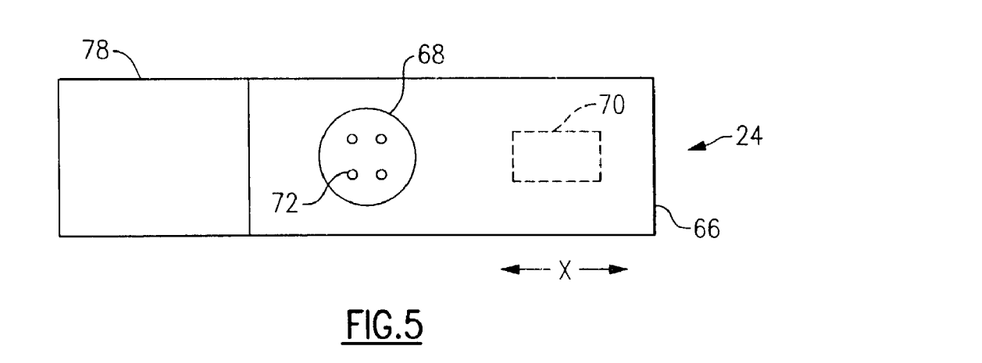
FIG. 5 schematically illustrates a top view of the loading device.
Figure 6:
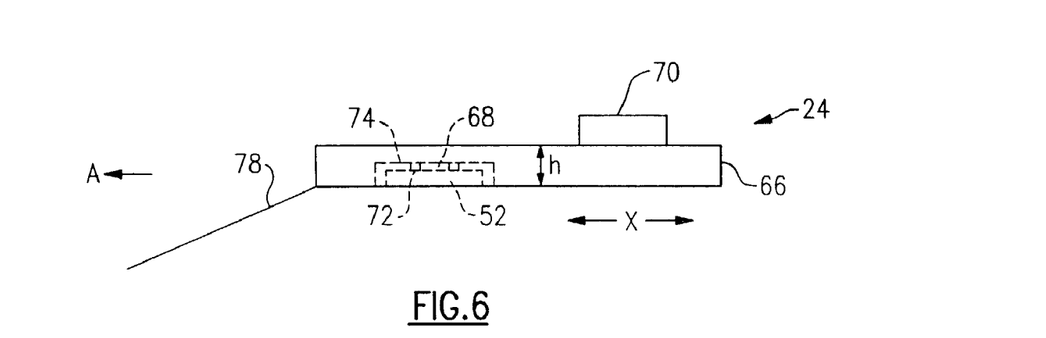
FIG. 6 schematically illustrates a side view of the loading device in a loading position.
Figure 7:
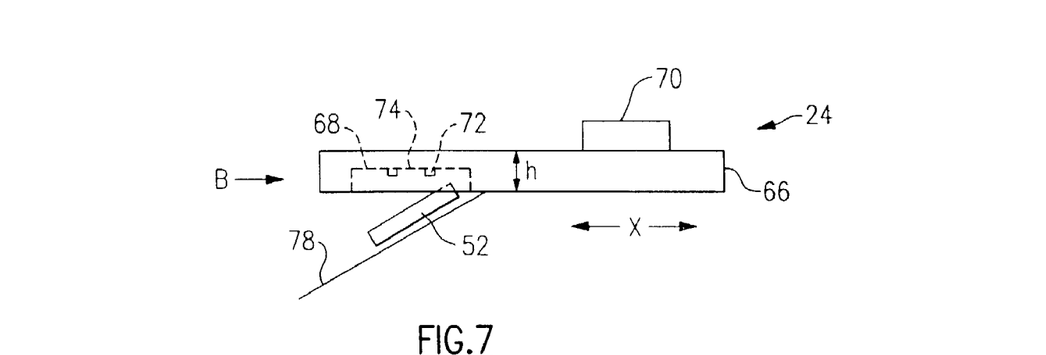
FIG. 7 schematically illustrates a side view of the loading device in a delivery position.

The food items 52 are transferred from the feeding side 34 of the freezer component 22 to the grilling component 26 by the loading device 24. An example loading device is schematically illustrated in FIGS. 5 to 7. For the below description, the platibrins 38c and 38d are located in the feeding side 34, although it is to be understood that the platfonus 38a and 38b can also be located in the feeding side 34 when the rotatable portion 28 is rotated. The illustrated loading device 24 includes a pair of feeders 66 each positioned above each of the platforms 38c and 38d in the feeding side 34 and are moveable in the X direction (i.e., right and left according to FIGS. 5–7) by a motor 70. Each feeder 66 includes a cutout 68 extending partially through the height h of the feeder 66. Preferably, the cutout 68 is circular and the same shape as the food items 52. A sensor 72 is located at the upper surface 74 of each of the cutout 68.

FIG. 6 illustrates one of the feeders 66 in the loading position. One of the platforms 38a, 38b, 38c and 38d moves into position to place a food item 52 in the cutout 68. When the sensor 72 detects that a food item 52 is located in the cutout 68, the motor 70 moves the feeder 66 in direction A (i.e., to the left in FIG. 6) and out of the front slot 76 (shown in FIG. 4) to the delivery position, as shown in FIG. 7. The food item 52 drops from the cutout 68 and slides down the ramp 78 (shown in FIG. 1) into the grilling component 26. The motor 70 then moves feeder 66 in direction B (i.e., to the right in FIG. 7) to the loading position. The motor 70 provides enough force to separate frozen food items 52 in case the food items 52 are frozen together. This repeats for alternating feeders 66 as the alternating platforms 38a and 38d rise to supply the food items 52.

During high demand times, both platforms 38a and 38b in the rotatable portion 34 can rise simultaneously. The sensors 72 in both of the feeders 66 are triggered at once, and both feeders 66 slide in direction A to the delivery position, allowing for two food items 52 to be delivered to the grilling component 26 at once.

Figure 8:
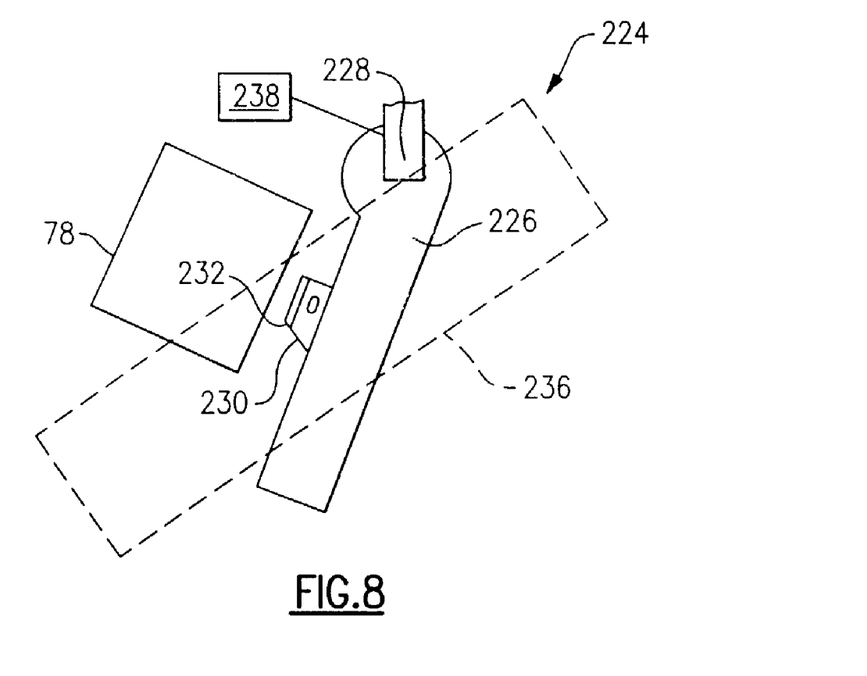
FIG. 8 schematically illustrates a top view of an alternative example of a loading device.
Figure 9:
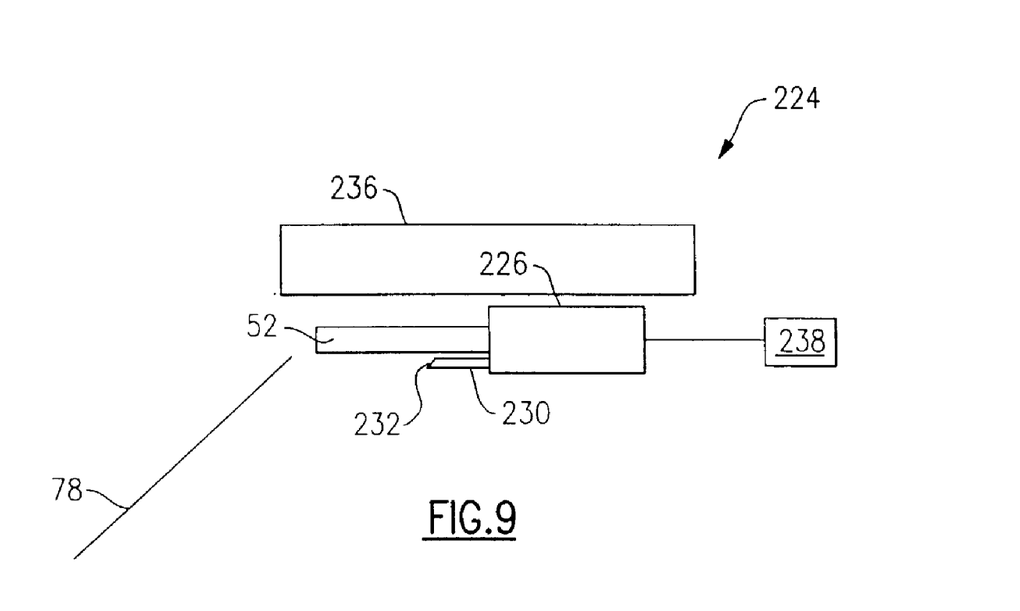
FIG. 9 schematically illustrates a side view of the alternative example of the loading device of FIG. 8.

FIGS. 8 and 9 illustrate an alternative example of the loading device 224 including an arm 226 pivotal about pivot point 228. The arm 226 includes a pusher 230 having an angled edge 232.

When a sensor 238 proximate to the arm 226 detects that a food item 52 is located proximate to the loading device 224, the arm 226 rotates about the pivot point 228. The angled edge 232 engages the food item 52, the pusher 230 sliding under the food item 52 and breaking apart the food items 52 if frozen together. The beam 236 over the arm 226 provides an upper boundary for the food item 52 as the pusher 230 slides under the food item 52. As the arm 226 continues to pivot, the food item 52 is pushed out of the front slot 76 (shown in FIG. 4) and down the ramp 78 for grilling.

Figure 10:
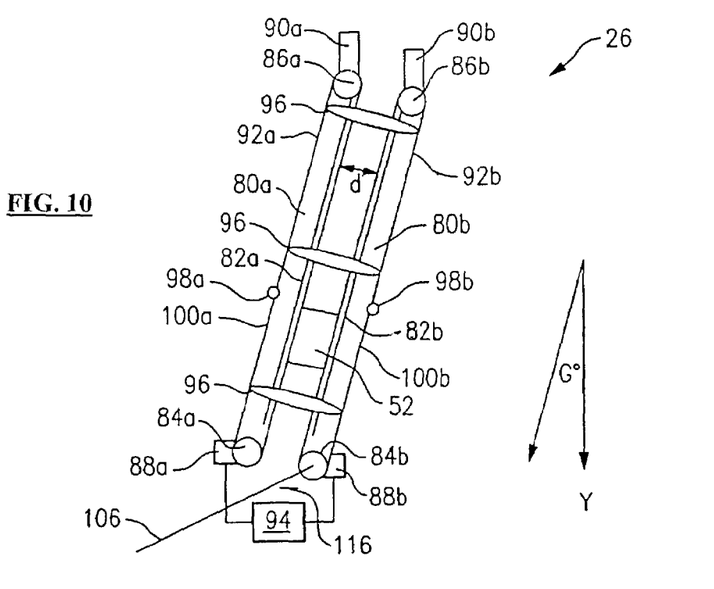
FIG. 10 schematically illustrates a front view of the grilling component.

After sliding down the ramp 78 from the loading device 24, the food items 52 are grilled by the grilling component 26. As schematically shown in FIG. 10, an example grilling component 26 includes a pair of grilling structures 80a and 80b separated by a gap d. Each grilling structure 80a and 80b includes a heater 82a and 82b, a drive pulley 84a and 84b, and a non-drive pulley 86a and 86b. In one example, the heaters 82a and 82b are electric resistance heaters. A conveyor belt 92a and 92b is positioned around the grilling structures 80a and 80b. The heater 82a and 82b in one example grill is at a temperature of 400° F. The drive pulleys 84a and 84b are powered by respective drive motors 88a and 88b to move the conveyor belts 92a and 92b, creating a surface that travels over the heaters 82a and 82b. The non-drive pulleys 86a and 86b are each controlled by a respective adjustment motor 90a and 90b. A drive controller 94 provides a control signal to the drive motors 88a and 88b to synchronize the speed of the conveyor belts 92a and 92b.

The food items 52 are grilled by passing the food items 52 in the gap d while food traveling between the conveyor belts 92a and 92b. As the food items 52 are squeezed within the gap d, the food items 52 do not slip between the conveyor belts 92a and 92. The heater 82a and 82b under the conveyor belts 92a and 92b provides heat to grill the food items 52.

The grilling structures 80a and 80b in the illustrated example are obliquely oriented at an angle of G° from the vertical Y direction (i.e., up and down in FIG. 1). In one example, the angle G is 5°. However, it is to be understood that other angles G are possible.

The conveyor belts 92a and 92b are made of any suitable material having a low coefficient of thermal expansion. In one example, the conveyor belts 92a and 92b are made of non-stick coated Invar™ commercially available from Imphy S. A. Corporation of Paris, France. Invar™ is a metal allow comprised of Iron and 36% Nickel, and may include other trace elements. In one example, the non-stick coating on the Invar™ is Teflon™ commercially available from E. I. DuPont Nemours and Company Corporation of Wilmington, Del. Invar has a low constant of thermal expansion and therefore expands very little when heated. Although Invar™ has been disclosed, it is to be understood that other materials having a low coefficient of thermal expansion can be used.

The distance d between the grilling structures 80a and 80b is set by threaded members 96. The distance d varies along the length of the grilling structures 80a and 80b and is determined by the size of the food items 52. By varies, it is meant that the distance d can be larger at different positions along the length of the grilling structures 80a and 80b. Preferably, the distance d is constant at each position along the length of the grilling structures 80a and 80b. However, the distance d can be adjustable by the threaded members 96 to allow for grilling different sizes of the food items 52 for a given automated grill 20.

Figure 11:
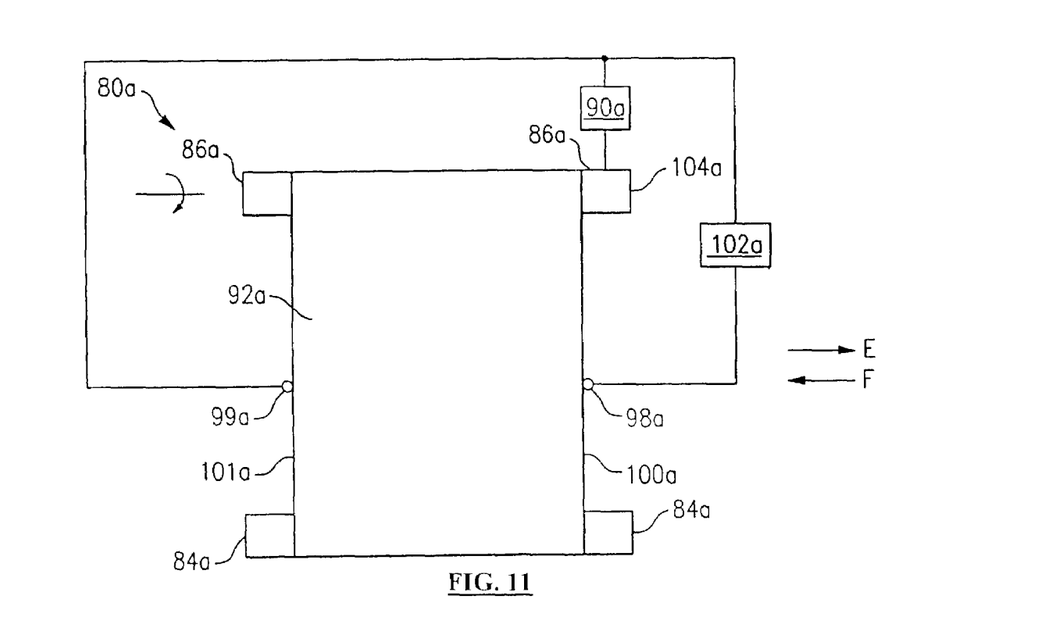
FIG. 11 schematically illustrates a side view of the grilling component.

During operation of the automated grill 20, it may be possible for the conveyor belts 92a and 92b to move laterally in the directions E or F (i.e., right or left, respectively, as shown in FIG. 2) and slide off of the pulleys 84a, 84b, 86a and 86b. As shown in FIG. 11, lateral sensors 98a and 98b positioned proximate to each of the respective edges 100a and 100b of the conveyor belts 92a and 92b, and another lateral sensor 99a and 99b is positioned proximate to the respective edges 101a and 101b of the conveyor belts 92a and 92b. The lateral sensors 98a, 98b, 99a and 99b continually monitor the position of the edges 100a, 100b, 101a, and 101b. If lateral movement is detected by the lateral sensors 98a or 99a, a controller 102a sends a signal to the adjustment motor 90a to move an end 104a of the non-drive pulley 86a to adjust for the lateral movement. Preferably, the lateral sensor 98a in one example is a non-contacting inductive proximity sensor. The adjustment motor 90*a* rotates to move the non-drive pulley 86*a* to return the conveyor belt 92*a* to the desired position.

If the conveyor belt 92*a* has moved in the direction E (i.e., to the right in FIG. 11), the lateral sensor 99*a* does not sense the edge 101*a* of the conveyor belt 92*a*. The controller 102*a* then sends a signal to the adjustment motor 90*a* which rotates to raise the end 104*a* of the non-drive pulley 86*a* and move the conveyor belt 92*a* in the direction F (i.e., to the direction left in FIG. 11). After a predetermined amount of time, the lateral sensor 99*a* again tries to detect the presence of the edge 101*a* of the conveyor belt 92*a*. If the edge 101*a* of the conveyor belt 92*a* is detected, no further adjustment is needed. If the edge 101*a* of the conveyor belt 92*a* is not detected, the adjustment motor 90*a* rotates again to raise the end 104*a* of the non-drive pulley 86*a* to again move the conveyor belt 92*a* in the direction F. This is repeated until the conveyor belt 92*a* is detected by the sensor 99*a*.

Alternatively, if the conveyor belt 92*a* has moved in the direction F (i.e., to the left in FIG. 11), the lateral sensor 98*a* does not sense the edge 100*a* of the conveyor belt 92*a*. The controller 102*a* then sends a signal to the adjustment motor 90*a* which rotates to lower the end 104*a* of the non-drive pulley 86*a* and move the conveyor belt 92*a* in the direction E (i.e., to the direction right in FIG. 11). After a predetermined amount of time, the lateral sensor 98*a* again tries to detect the presence of the edge 100*a* of the conveyor belt 92*a*. If the edge 100*a* of the conveyor belt 92*a* is detected, no further adjustment is needed. If the edge 100*a* of the conveyor belt 92*a* is not detected, the adjustment motor 90*a* rotates again to lower the end 104*a* of the non-drive pulley 86*a* to again move the conveyor belt 92*a* in the direction E. This is repeated until the edge 100*a* of the conveyor belt 92*a* is detected by the sensor 98*a* in the desired location. Although two sensors 98*a*, 99*a* and 98*b*, 99*b* are disclosed for each conveyor belt 92*a* and 92*b*, it is to be understood that only one sensor can be employed. Additionally, it is to be understood that sensors 98*a* and 98*b* operate in a similar manner.

Figure 12:
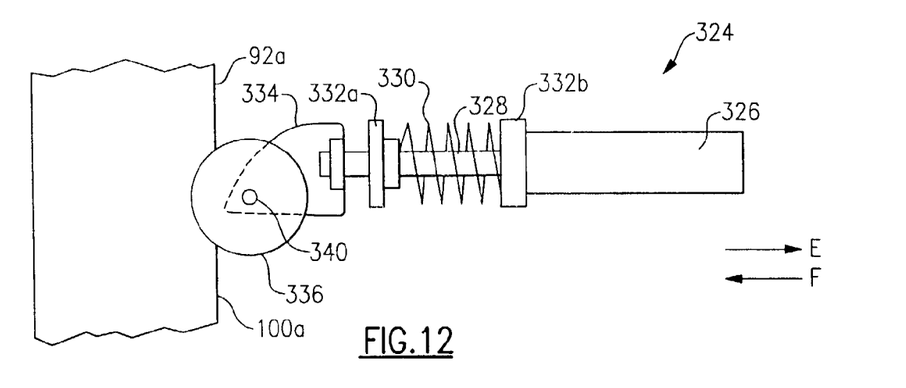
FIG. 12 schematically illustrates a side view of a second example of a lateral sensor.
Figure 13:
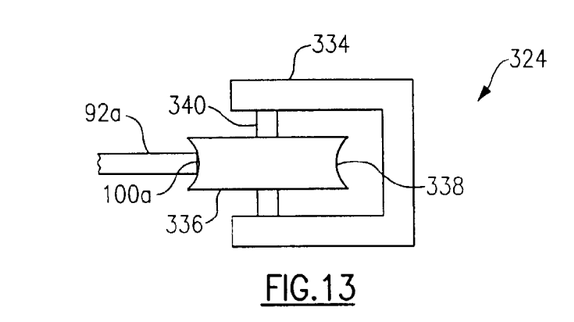
FIG. 13 schematically illustrates a top view of a second example of a lateral sensor.

FIGS. 12 and 13 illustrate a second example of a lateral sensor 324. The lateral sensor 324 includes a proportional sensor 326, such as a linear variable displacement transducer or a linear potentiometer, having a shaft 328. A spring 330 is positioned between a pair of washers 332*a* and 332*b* on the shaft 328 and provides resistance to a yoke 334. A rotatable wheel 336 having a groove 338 is secured to the yoke 334 by a rod 340. In one example, the rotatable wheel 336 is ½ inch in diameter and has a thickness of ⅛ inch to accommodate the conveyor belt 92*a* and 92*b* dimensions. The groove 338 contacts the edge 100*a* of the conveyor belt 92*a*.

The proportional sensor 326 determines if the edge 100*a* of the conveyor belt 92*a* has moved laterally by monitoring the resistance in the spring 330. If the edge 100*a* of the conveyor belt 92*a* moves in the direction E, the yoke 334 responsively compress the spring 330, increasing the resistance in the spring 330. The controller 102*a* receives a corresponding indication from the proportional sensor 326 and responsively sends a signal to the adjustment motor 90 to raise the end 104*a* of the non-drive pulley 86*a* and laterally adjust the conveyor belt 92*a* a proportional amount in the direction B. Alternatively, if the edge 100*a* of the conveyor belt 92*a* moves in the direction F, the yoke 334 responsively expands the spring 330, decreasing the resistance in the spring 330. The controller 102*a* receives a corresponding indicating from the proportional sensor 326 and responsively sends a signal to the adjustment motor 90 to lower the end 104*a* of the non-drive pulley 86*a* and laterally adjust the conveyor belt 92*a* a proportional amount in the direction A.

Figure 14:
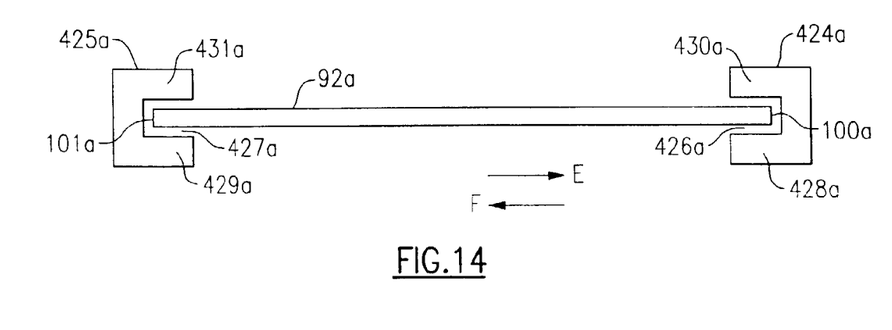
FIG. 14 schematically illustrates a top view of a third example of a lateral sensor.

Alternatively, as shown in FIG. 14, a lateral sensor 424*a* and 425*a* including a Hall effect sensor 430*a* and 431*a*, respectively, is positioned proximate to each of the respective edges 100*a* and 101*a*. The edges 100*a* and 101*a* of the conveyor belt 92*a* are positioned in a channel 426*a* and 427*a*, respectively, in the lateral sensor 424*a* and 425*a*, respectively. As the edge 100*a* of the conveyor belt 92*a* moves laterally in the direction F away from the channel 426*a*, the Hall effect sensor 430*a* detects a change in the magnetic field 428*a*, indicating that the edge 100*a* of the conveyor belt 92*a* has moved laterally.

The conveyor belt 92*a* is laterally adjusted in the direction F by rotating the adjustment motor 90*a* in the manner described above. Alternatively, as the edge 101*a* of the conveyor belt 92*a* moves laterally in the direction E away from the channel 427*a*, the Hall effect sensor 431*a* detects a change in the magnetic field 429*a*, indicating that the edge 101*a* of the conveyor belt 92*a* has moved laterally. The conveyor belt 92*a* is laterally adjusted in the direction F by rotating the adjustment motor 90*a* in the manner described above. Although not shown, it is to be understood that a lateral sensor including a Hall effect sensor (not shown) is positioned on the edges 100*b* and 101*b* of the conveyor belt 92*b*.

Returning to FIG. 1, after exiting the grilling component 26, each food item 52 slides down an exit ramp 106 and onto a holding area 108 for storage until removal for serving. Preferably, the holding area 108 consists of a plurality of rollers 114. A heater 110 is positioned over the holding area 108 to heat the food items 52. An automatic seasoner 112 can also be positioned over the holding area 108 to dispense selected seasonings such as salt on the food items 52 after grilling.

As shown in FIG. 10, one example automated grill 20 includes other features, such as a grease dripper 116 or a grill scraper to clean the conveyor belts 92*a* and 92*b*. Returning to FIG. 1, a hood 120 can also be placed above the automated grill 20 to provide ventilation. Additionally, the frozen food items 52 can be placed in the freezer component 22 in cartridges which contain several items of food 52, reducing crew labor in loading.

There are several benefits and advantages provided by the automatic grill of the present invention that enhances the economizes associated with preparing the food items. As the food items are automatically loaded and removed from the automated grill, crew labor is reduced and safety is improved. The inventive automated grill of this invention also has a smaller footprint than the prior art grills, requiring less space. The inventive automated grill, including the stacked food items configuration, reduces the surface area of the food items exposed to the environment.

Additionally, as the food items are grilled after operator input or POS input, the food items are grilled to order. As the automated grill is automated, improvements in the quality and consistency of the food items is possible. Finally, by angling the grilling structures, the food items are loaded closer to the grill inlet, exit closer to the point of use, and therefore reduces raw food dropping on the cooked food.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An automated grill comprising:
    a freezer component that maintains an item in a frozen condition;
    a grilling component for grilling said item;
    a moveable loading device that automatically transfers a selected amount of said item from said freezer component directly to said grilling component; and
    a sensor, wherein said loading devices moves responsively when said sensor detects said item.

2. The automated grill as recited in claim 1 wherein said grilling component includes a pair of grilling structures separated by a gap, each of said grilling structures including a heater and a conveyor belt, and said item is grilled while traveling in said gap between said grill structures on said conveyor belts.

3. The automated grill as recited in claim 2 wherein said pair of grilling structures are angled approximately 5° from a vertical line.

4. The automated grill as recited in claim 2 wherein each grill structure includes a drive pulley powered by a drive motor to drive said conveyor belts, and a drive provides a pulse to said drive motors to synchronize said drive motors and to move said conveyor belts at an equal speed.

5. The automated grill as recited in claim 1 further including a holding area, wherein said grilled item slides onto said holding area after exiting said grilling component.

6. The automated grill as recited in claim 5 wherein said holding area is heated.

7. The automated grill as recited in claim 1 wherein said loading device moves in a substantially horizontal direction.

8. The automated grill as recited in claim 1 wherein said freezer component further includes a rotatable carousel and a stop, and said stop prevents over rotation or said carousel.

9. The automated grill as recited in claim 2 wherein said conveyor belt is made of a iron and nickel alloy.

10. The automated grill as recited in claim 2 wherein said gap between said conveyor belts is adjustable.

11. The automated grill as recited in claim 1 further including a controller that sends a request to said automated grill to automatically transfer said selected amount of said item from said freezer component to said grilling component.

12. The automated grill as recited in claim 1 wherein the freezer component includes a moveable platform that moves in response to a request for said selected amount of said item.

13. The automated grill as recited in claim 1 wherein said grilling component is substantially vertical.

14. The automated grill as recited in claim 12 wherein said moveable platform moves in a substantially vertical direction.

15. An automated grill comprising:
    a freezer component that maintains an item in a frozen condition, wherein said freezer component includes a moveable portion, a loading side for loading of said item in said freezer component, a feeding side for the removal of said item from said freezer component in response to a request for said item, and at least one item supporting platform in each of said loading side and said feeding side slidingly moveable along said moveable portion;
    a grilling component for grilling said item; and
    a loading device that automatically transfers a selected amount said item from said freezer component directly to said grilling component.

16. The automated grill as recited in claim 15 wherein said item is selectively stacked on said at least one said item supporting platform in said loading side, and said item is delivered to said loading device by raising said at least one item supporting platform in said feeding side in response to said request.

17. The automated grill as recited in claim 16 wherein said at least one platform in said feeding side comprise two platforms, said two platforms in said feeding side alternately raising in response to said request.

18. The automated grill as recited in claim 16 wherein said moveable portion is mounted on a rotatable carousel, and rotation of said rotatable carousel 180° transfers said at least one platform between said feeding side and said loading side.

19. The automated grill as recited in claim 18 wherein said freezer component further includes a lower sensor and an upper sensor, said rotatable carousel rotating 180° responsive to said upper sensor indicating that said at least one platform located in said feeding side is above a first selected position, and said lower sensor indicating when said at least one platform located in said loading side is below a second selected position.

20. An automated grill comprising:
    a freezer component that maintains an item in a frozen condition;
    a grilling component for grilling said item; and
    a loading device that automatically transfers a selected amount of said item from said freezer component dircefly to said grilling component, wherein said loading device includes at least one moving device and a item sensor, and said at least one moving device moves responsively when said item sensor senses said item.

21. The automated grill as recited in claim 20 wherein said at least one moving device is a feeder having a cutout, and said cutout of said feeder is located to receive said item in said freezer component in response to said request.

22. The automated grill as recited in claim 21 wherein said feeder slides from a loading position to a delivery position when the item sensor detects that said item is located in said cutout of said feeder, removing said item from said freezer component.

23. The automated grill as recited in claim 20 wherein said moving device comprises a pivotally supported arm which pivots to slide said item out of said freezer component when said item sensor detects said item is proximate to said pivotal arm.

24. An automated grill comprising:
    a freezer component that maintains an item in a frozen condition;
    a grilling component for grilling said item;
    a loading device that automatically transfers a selected amount of said item from said freezer component directly to said grilling component in response to a request for said selected amount; and
    a controller associated with said automated grill, wherein said request comprises a signal sent by a POS device to said controller, and said controller provides another signal to transfer said selected amount of said item from said freezer component to said grilling component in response to said signal.

25. A method for grilling an item comprising the steps of:
    loading said item into a freezer component;
    sending a signal to an automated grill;
    sensing the item in the freezer component;
    automatically transferring said item from said freezer component to a grilling component in response to said signal when the step of sensing detects the item;
    grilling said item in said grilling component; and
    automatically transferring said item out of said grilling component after said item is grilled.

* * * * *

UNITED STATES PATENT AND TRADEMARK OFFICE
CERTIFICATE OF CORRECTION

PATENT NO. : 7,001,626 B2 Page 1 of 1
APPLICATION NO. : 10/124629
DATED : February 21, 2006
INVENTOR(S) : Sands et al.

It is certified that error appears in the above-identified patent and that said Letters Patent is hereby corrected as shown below:

Claim 1, Column 9, line 9: "devices" should read as --device--

Signed and Sealed this

Ninth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,001,626 B2  Page 1 of 1
APPLICATION NO. : 10/124629
DATED : February 21, 2006
INVENTOR(S) : Jeffrey L. Sands et al.

It is certified that error appears in the above-identified patent and that said Letters Patent is hereby corrected as shown below:

Column 4, line 15, "empryposition" should read -- empty position --;
Column 6, line 33, "allow" should read -- alloy --;
Column 7, line 55, "compress" should read -- compresses --;
        line 65, "indicating" should read -- indication --;
Column 8, line 46, "economizes" should read -- economies --.

Column 10, claim 20, line 27, "dircefly" should read -- directly --;
        line 28, "a" should read -- an --.

Signed and Sealed this

Tenth Day of March, 2009

JOHN DOLL
*Acting Director of the United States Patent and Trademark Office*